United States Patent [19]

Baker

[11] Patent Number: 5,282,032
[45] Date of Patent: Jan. 25, 1994

[54] ERROR DETECTION/CONCEALMENT FOR SERIAL DIGITAL VIDEO

[75] Inventor: Daniel G. Baker, Aloha, Oreg.
[73] Assignee: Tektronix, Inc., Wilsonville, Oreg.
[21] Appl. No.: 941,492
[22] Filed: Sep. 8, 1992
[51] Int. Cl.$^5$ .............................................. H04N 5/14
[52] U.S. Cl. ........................................ 358/139; 371/3; 371/5.1; 358/160
[58] Field of Search ................. 358/163, 166, 167, 36, 358/37, 139, 160, 10; 371/3, 501, 15.1, 16.1, 57.2, 67.1; 328/144; H04N 5/14, 5/226

[56] References Cited

U.S. PATENT DOCUMENTS

| | | | |
|---|---|---|---|
| 3,643,027 | 2/1972 | Goldberg | 371/5.1 |
| 4,566,100 | 1/1986 | Mizuno et al. | 371/5.1 |
| 5,113,397 | 5/1992 | Kaaden et al. | 371/5.1 |
| 5,208,666 | 5/1993 | Elkind et al. | 358/139 |

Primary Examiner—Mark R. Powell
Assistant Examiner—Glenton B. Burgess
Attorney, Agent, or Firm—Francis I. Gray

[57] ABSTRACT

A method of detecting bit errors in serial digital video uses a digital demodulator to process a parallel video data signal derived from the serial digital video. The output of the demodulator is converted to analog, low-pass filtered, squared and compared with a threshold value. The result of the comparison produces an error signal when bit errors occur. The bit errors may be counted over a predetermined time period, may be used to switch a data filter into the video data output path to conceal the bit errors, and may be used to map the bit errors to a display for visualization of the location of the errors within a video image represented by the serial digital video.

8 Claims, 2 Drawing Sheets

ERROR DETECTION/CONCEALMENT FOR SERIAL DIGITAL VIDEO

BACKGROUND OF THE INVENTION

The present invention relates to measurement of the performance of a serial digital data link, and more particularly to a method of error detection/concealment for serial digital video that operates in-service without any special data coding.

Currently the Digital Serial Standard for transferring either composite or component digital video is subject to debate. The proposed Digital Serial Standard uses a scrambler/descrambler to lower the DC component of the serial data stream and to facilitate clock recovery. A measure of the performance of the serial digital transfer link is needed to determine threshold headroom. Bit Error Rate (BER) is an industry standard measure of link performance, especially when the link is not "bursty" or data dependent. However, BER testers are usually used out-of-service since they must source test data to stress the link.

Recently a new method has been proposed, as disclosed in U.S. Pat. No. 5,208,666 issued May 4, 1993 to Robert Elkind et al entitled "Error Detection for digital Television Equipment", that entails inserting a Cyclic Redundancy Code (CRC) in every field at a transmitting device to allow a receiver to determine, among other things, if one or more bit errors have occurred in the field. This allows BER determination up to about an average of five errors/field and requires that all transmitting and receiving devices have the encoding and decoding hardware installed.

What is desired is a method of error detection/concealment for serial digital video that operates in-service without any special data coding required.

SUMMARY OF THE INVENTION

Accordingly the present invention provides a method of error detection/concealment for serial digital video by filtering the Nyquist region of the serial digital video to separate the impulse spectrum caused by bit errors from the video spectrum and detect the occurrence of a bit error by its spectral signature. The serial digital video is input to a digital demodulator, converted to analog and lowpass filtered. The filtered analog signal is squared and compared with a threshold to detect errors. The errors may be counted and displayed in a suitable manner. For concealment the errors may be used to switch a median filter into the digital video path between the input and the output so that median digital values for the digital video replace the received digital values at the point where an error occurs. Additionally the occurrences of errors may be mapped into a memory to provide a visual representation of where in a video image, represented by the serial digital video, the errors occur.

The objects, advantages and other novel features of the present invention are apparent from the following detailed description when read in conjunction with the appended claims and attached drawing.

BRIEF DESCRIPTION OF THE DRAWING

FIG. 3 is a block diagram view of an error concealment application using the error detector of FIG. 1.

FIG. 4 is a block diagram view of an error mapping application using the error detector of FIG. 1.

DESCRIPTION OF THE PREFERRED EMBODIMENT

Figure 1:
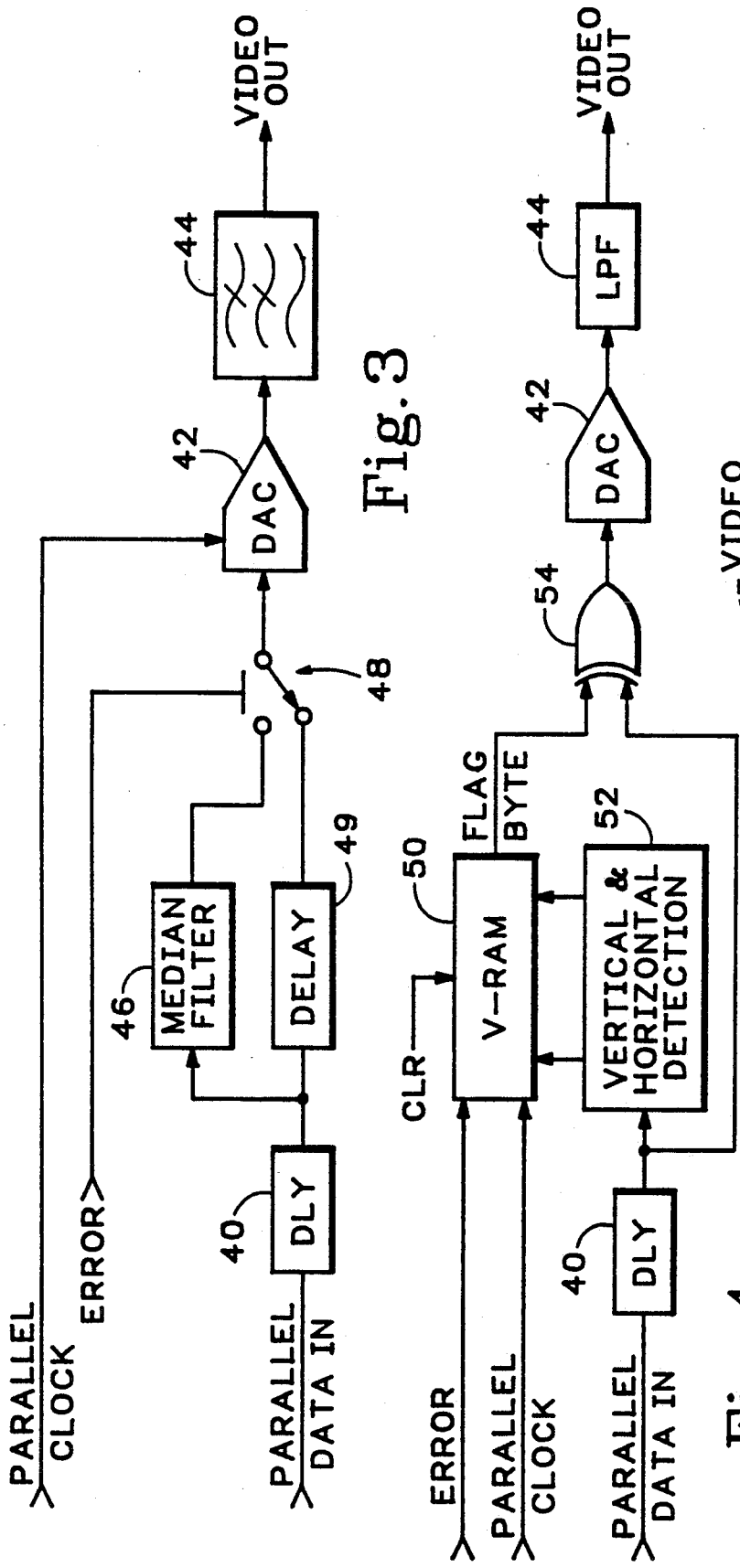
FIG. 1 is a pictorial representation of the result of a bit error in digital video data.

The proposed Digital Serial Standard for video uses a scrambler/descrambler to lower the DC component of the data stream and to facilitate clock recovery. The serial digital video is descrambled, stripped of protocol data, and converted to parallel form. The parallel video data is clocked into a digital to analog converter (DAC) and then lowpass filtered to produce a video output. The descrambler causes bit errors in the serial digital transmission link to propagate such that seventy percent (70%) of single bit errors cause amplitude errors in ten-bit data of greater than thirty percent (30%). In fact ninety percent (90%) of all single bit errors cause more than fifteen percent (15%) amplitude errors in detected video. The bit error is essentially a data impulse of random polarity and amplitude added to the ten-bit video parallel data. This data impulse is not bandlimited and has energy up through the Nyquist frequency, one-half the sampling frequency $f_s$. This causes a recovery filter in the video path to ring and further increases the visibility of the error in the video image. The video data, on the other hand, is almost always bandlimited by an anti-alias filter or the nature of the video source. As shown in FIG. 1 the bit error causes a parallel digital video data point, when converted to analog by a digital-to-analog converter, to have an abrupt, step-like amplitude change. This causes a rectangular pulse of one sample period to be added to the analog signal.

A video signal is generally bandlimited to below the Nyquist frequency. As the Nyquist frequency is approached, the amplitude response versus frequency starts to drop off sharply. On the other hand an impulse has an amplitude versus frequency spectrum that is constant as the Nyquist frequency is approached. Therefore by highpass filtering the Nyquist region of the frequency spectrum of the digital video, the impulse spectrum is separated from the video spectrum. When the filtered impulse exceeds a given threshold, it is distinguished from the video component of the signal and an error is detected at the time it occurs.

Figure 2:
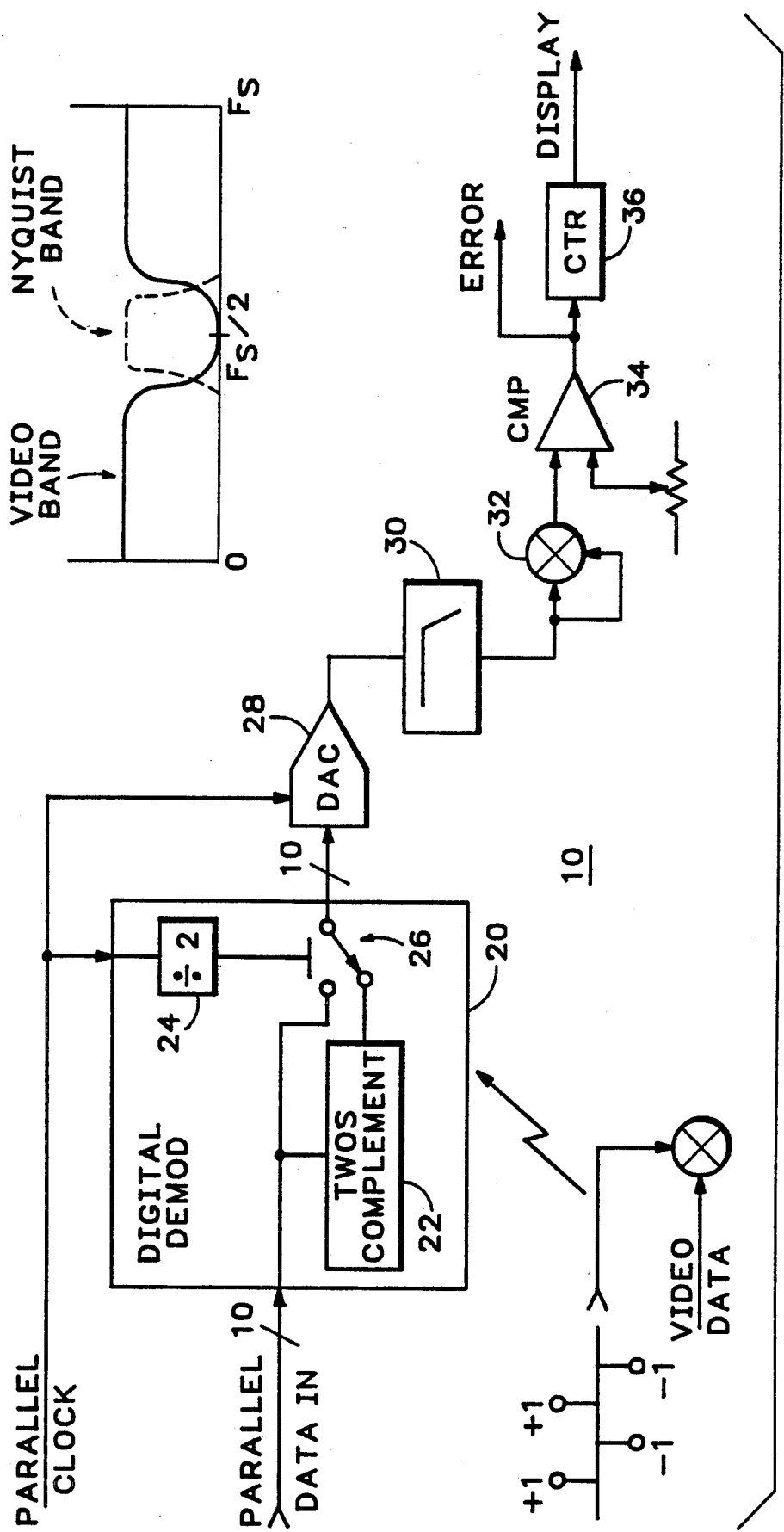
FIG. 2 is a block diagram view of an error detector for serial digital video according to the present invention.

Referring now to FIG. 2 an error detector 10 is shown. The parallel digital video data is input to the detector 10 together with a recovered parallel clock signal. The parallel digital video data is filtered by first translating the Nyquist band to D.C. by a digital demodulator 20 and then lowpass filtering the output. The digital demodulator 20 includes a two's complementer 22, a divide by two circuit 24 and a switch 26. The parallel digital video data is input to the two's complementer 22 and to one pole of the switch 26. The output from the two's complementer 22 is applied to another pole of the switch 26. The position of the switch 26 is controlled by the output from the divider 24, which has the parallel clock as input. On alternate cycles of the parallel clock either the direct or two's complemented parallel digital video data in output from the switch 26. The output of the switch 26 is input to a DAC 28 to produce an analog video signal. The analog video signal is filtered by a simple analog lowpass filter 30, effecting the desired highpass response. Alternatively the digital video data may be first digitally highpass filtered and then mixed down by an identical demodulator before conversion to analog. However, the present embodiment shown in FIG. 2 allows the use of an analog lowpass filter. The output of the filter 30 is input to a multiplier 32 configured as a squaring circuit to convert negative going errors to positive going errors and to facilitate detection. The squared output from the multiplier 32 is then input to a comparator 34. Also input to the comparator 34 is a variable threshold level. If the squared output from the multiplier 32 exceeds the variable threshold level, an error is detected. The error may be input to a counter 36 that counts the number of errors occurring every field or frame to determine an error rate, or may be used for error concealment or error mapping as described below.

An adequate digital demodulator 20 may be implemented by simply inverting alternate data values using exclusive-OR (XOR) logic. The demodulator 20 multiplies the digital data by one-half the sample frequency $f_s$ and converts the Nyquist region to a band around DC. The threshold at the comparator 34 may be set to detect the minimum pulse amplitude representing the desired level of error detection, or may be set to higher values to detect only the most visible or annoying pixel errors, thereby ignoring those bit errors that, when converted to parallel video data, are small in magnitude.

As shown in FIG. 3 after the serial video data has been descrambled and converted to parallel digital data, it is input via a delay circuit 40 to a DAC 42. The output of the DAC 42 is input to a lowpass filter 44 to produce a video output signal. The output of the delay circuit 40 also is input to a data filter 46, such as a median filter that operates over several data samples. The unfiltered output from the delay circuit 40 and the filtered data from the data filter 46 are input to two poles of a switch 48. The output from the switch 48 is the input to the DAC 42, and is determined by the ERROR signal from the error detector shown in FIG. 2. The delay circuit 40 serves to compensate for the inherent processing time of the error detector so that the output of the data filter 46 is input to the DAC 42 when erroneous data is detected in the digital video signal. A second delay filter 49 is included in the straight through path to the switch 48 to compensate for the processing time of the data filter 46 so that when the ERROR signal causes the switch to select the other input for output there is no discontinuity in the output signal presented to the DAC 42.

A further use of the ERROR signal from the error detector is shown in FIG. 4 to map the location of the error into the digital video signal. When the ERROR signal occurs a video memory 50, clocked by the parallel clock and addressed by a vertical and horizontal detector circuit 52, stores a flag bit. The flag bit from the memory 50 is used to key a FLAG BYTE for input to an XOR circuit 54 for combination with the parallel video data. The output of the XOR circuit 54 is input to the DAC 42 and filtered by the lowpass filter 44 to produce the video output signal. The video output signal, when displayed on a video monitor, has flag or marker values instead of image pixel values where the ERROR signal occurred. This provides the ability to visually determine where the errors occurred, and to correlate whether the errors are related to the video image data as opposed to occurring randomly.

Thus the present invention provides an method of error detection for serial digital video that flags when a bit error occurs without the need for special hardware during in-service operation by performing a spectrum analysis of the parallel video data derived from the serial digital video to detect impulses indicative of such an error.

What is claimed is:

1. An apparatus for detecting bit errors in serial digital video comprising:
   first means for filtering a parallel video data signal derived from the serial digital video to produce a highpass filtered signal;
   means for squaring the highpass filtered signal to produce a squared output; and
   means for comparing the squared output with a threshold value to produce an error signal when bit errors are present in the serial digital video.

2. The apparatus of claim 1 further comprising:
   second means for filtering the parallel video data signal to produce a filtered video signal;
   means for selecting between the filtered video signal and the parallel video data signal as a function of the error signal to produce a selected video signal; and
   means for converting the selected video signal to a video output signal.

3. The apparatus of claim 1 further comprising:
   means for storing the error signal to map a display of the serial digital video;
   means for addressing storing means in synchronization with the parallel video data signal;
   means for combining a marker signal from the storing means, corresponding to locations where the error signal is stored, with the parallel video data signal to produce a mapped signal; and
   means for converting the mapped signal to a video output signal that, when displayed, uniquely indicates the location of the bit errors within the serial digital video.

4. The apparatus of claim 1 wherein the first filtering means comprises:
   means for translating a Nyquist band of frequencies in the parallel video data signal to D.C. to produce a translated signal; and
   means for converting the translated signal to the highpass filtered signal.

5. A method of detecting bit errors in serial digital video comprising the steps of:
   filtering a parallel video data signal derived from the serial digital video to produce a filtered signal representing a Nyquist band of frequencies for the parallel video data signal;
   squaring the filtered signal to produce a squared output; and
   comparing the squared output with a threshold value to produce an error signal when bit errors are present in the serial digital video.

6. The method of claim 5 further comprising the steps of:
   filtering the parallel video data signal to produce a filtered parallel video data signal;
   selecting between the filtered parallel video data signal and the parallel video data signal as a function of the error signal to produce a selected video signal; and
   converting the selected video signal to a video output signal.

7. The method of claim 5 further comprising the steps of:

storing the error signal in a memory to map a display of the serial digital video;

addressing the memory in synchronization with the parallel video data signal;

combining a marker signal from the memory, corresponding to locations where the error signal is stored, with the parallel video data signal to produce a mapped signal; and converting the mapped signal to a video output signal that, when displayed, uniquely indicates the location of the bit errors within the serial digital video.

8. The method of claim 5 wherein the Nyquist band filtering step comprises the steps of:

translating the Nyquist band of frequencies in the parallel video data signal to D.C. to produce a translated signal; and converting the translated signal to the highpass filtered signal.

* * * * *